United States Patent [19]

Weiland

[11] Patent Number: 5,280,991

[45] Date of Patent: Jan. 25, 1994

[54] HEADLINER

[75] Inventor: Walter M. Weiland, Holland, Mich.

[73] Assignee: Prince Corporation, Holland, Mich.

[21] Appl. No.: 23,923

[22] Filed: Feb. 26, 1993

Related U.S. Application Data

[63] Continuation of Ser. No. 838,599, Feb. 19, 1992, abandoned.

[51] Int. Cl.5 .............................................. B60R 13/02
[52] U.S. Cl. ................................ 296/214; 296/34.3;
52/511; 160/DIG. 16
[58] Field of Search ....................... 296/39.1, 39.3, 214;
52/511; 24/303; 403/DIG. 1; 160/DIG. 16;
248/206.5, 309.4, 683; 335/303; 206/818

[56] References Cited

U.S. PATENT DOCUMENTS

| | | |
|---|---|---|
| 2,639,751 | 5/1953 | Flaherty . |
| 2,797,370 | 6/1957 | Bennett ............................ 335/303 |
| 2,959,832 | 11/1960 | Baermann ...................... 335/303 X |
| 3,102,314 | 9/1963 | Alderfer ............................. 24/303 |
| 3,141,214 | 7/1964 | Bey ..................................... 24/303 |
| 3,257,586 | 6/1966 | Steingroever ...................... 335/303 |
| 3,365,684 | 1/1968 | Stemke ........................... 206/818 X |
| 3,679,505 | 2/1971 | Hinderaker et al. . |
| 3,805,872 | 4/1974 | Lorber .............................. 160/354 |
| 3,897,288 | 7/1975 | Fayling ............................ 24/303 |
| 3,953,067 | 4/1976 | Isola ................................ 296/214 |
| 4,113,303 | 9/1978 | Yench ............................. 49/465 X |
| 4,172,918 | 10/1979 | Doerer .......................... 296/214 X |
| 4,220,368 | 9/1980 | Ferrigan ........................... 296/215 |
| 4,337,974 | 7/1982 | Kohlpaintner et al. ........... 296/214 |
| 4,510,986 | 4/1985 | Schwanki ......................... 160/354 |
| 4,516,804 | 5/1985 | Yamawaki et al. ................ 296/214 |
| 4,616,456 | 10/1986 | Parker ............................... 52/202 |
| 4,639,035 | 1/1987 | Isaacson ........................... 296/218 |
| 4,741,945 | 5/1988 | Brant et al. .................... 296/214 X |
| 4,779,390 | 10/1988 | Repper .......................... 296/20 X |
| 4,788,964 | 12/1988 | Dorsey et al. .................. 126/299 R |
| 4,828,910 | 5/1989 | Haussling ......................... 428/284 |
| 4,840,832 | 6/1989 | Weinle et al. ..................... 428/156 |
| 4,923,245 | 5/1990 | Kuwabara ......................... 296/214 |
| 4,987,671 | 1/1991 | Clausen-Schaumann ...... 296/216 X |
| 5,148,580 | 9/1992 | Dychow .............................. 24/303 |

FOREIGN PATENT DOCUMENTS

| | | | |
|---|---|---|---|
| 3100270 | 8/1982 | Fed. Rep. of Germany ..... 296/39.1 |
| 3527541 | 2/1987 | Fed. Rep. of Germany ...... 296/214 |
| 0191273 | 8/1987 | Japan ................. 296/39.1 |
| 0172075 | 7/1989 | Japan ................. 296/39.3 |

OTHER PUBLICATIONS

Koroseal Flexible Magnetic Strip Bulletin No. 24, B.F. Goodrich Industrial Products Co., Apr. 9, 1961.

Primary Examiner—Dennis H. Pedder
Attorney, Agent, or Firm—Price, Heneveld, Cooper, DeWitt & Litton

[57] ABSTRACT

A vehicle headliner includes a preformed headliner substrate which can be of molded construction and which includes an upper surface facing the roof of a vehicle. Attached at a plurality of locations on the upper surface of the headliner are magnets bonded to the upper surface of the headliner and positioned for engaging contact with aligned metallic vehicle roof structure once installed. In one preferred embodiment, the magnets are flexible extruded magnetic strips positioned to at least partially surround a relatively large aperture formed in the headliner such as one defining a sunroof opening. In a preferred embodiment of the invention also, the magnetic strips are attached to the headliner using a cushioning material such as a foam to provide acoustical damping for the headliner.

6 Claims, 1 Drawing Sheet

HEADLINER

This is a continuation of application Ser. No. 07/838,599, filed Feb. 19, 1992, now abandoned.

BACKGROUND OF THE INVENTION

The present invention pertains to a vehicle headliner and particularly to a structure for mounting the headliner to the roof of a vehicle.

Headliners have been attached to the roof of vehicles in a variety of manners. Some headliners are attached using screw or snap-in fasteners while others have employed adhesives. Hook and loop type fasteners such as VELCRO have also been recently employed. One difficulty with such fastening structures, including hook and loop fasteners, is that once attached the headliner locks into position and no longer can be shifted laterally thereby requiring that the alignment and attachment of the headliner to the vehicle roof be precise when it is initially made. This is difficult to achieve in an assemblyline environment.

A particular problem area for attaching a headliner to the roof of a vehicle has been in the area of a sunroof where relatively large rectangular openings for the sunroof are required The edge of such opening formed through the roof of a vehicle frequently has little supporting roof structure immediately adjacent the opening. It is difficult therefore to adequately support the edges of the correspondingly aligned opening in the headliner. While a variety of vehicle accessories such as grab handles, visors, overhead consoles and the like have been used to assist in mounting headliners to a vehicle, the area near the sunroof has posed a continuous problem in terms of providing a neat trim appearance to the edge of the headliner while holding it closely adjacent the vehicle sunroof opening.

SUMMARY OF THE PRESENT INVENTION

The system of the present invention overcomes the difficulty of providing the efficient alignment and attachment of a headliner to a vehicle roof during assembly and provides a neat and trim appearance to the headliner area adjacent apertures of a vehicle such as a sunroof opening. The invention provides a mounting structure for a vehicle headliner which allows the headliner to be installed and move slightly into a final position during its installation. Headliners embodying the present invention include a preformed headliner substrate which can be of molded construction and which includes an upper surface facing the roof of a vehicle. Attached at one or more locations on the upper surface of the headliner is magnet means bonded to the upper surface of the headliner and positioned for engaging contact with aligned metallic vehicle roof structure once installed.

In one preferred embodiment of the invention, the magnet means included a plurality of spaced elongated magnetic strips positioned to at least partially surround a relatively large aperture formed in the headliner such as one defining a sunroof opening. In a preferred embodiment of the invention also, the magnetic strips are attached to the headliner using a cushioning material such as a foam to provide acoustical damping for the headliner.

Such construction allows the headliner to be initially placed in the roof of a vehicle during assembly of the vehicle and held using the magnetic strips which permit some shifting of the headliner into final alignment prior to the installation of grabhandles, visors and other vehicle accessories when employed. These and other features, objects and advantages of the present invention will become apparent upon reading the following description thereof together with reference to the accompanying drawings in which:

DETAILED DESCRIPTION OF THE PREFERRED EMBODIMENT

Figure 1:
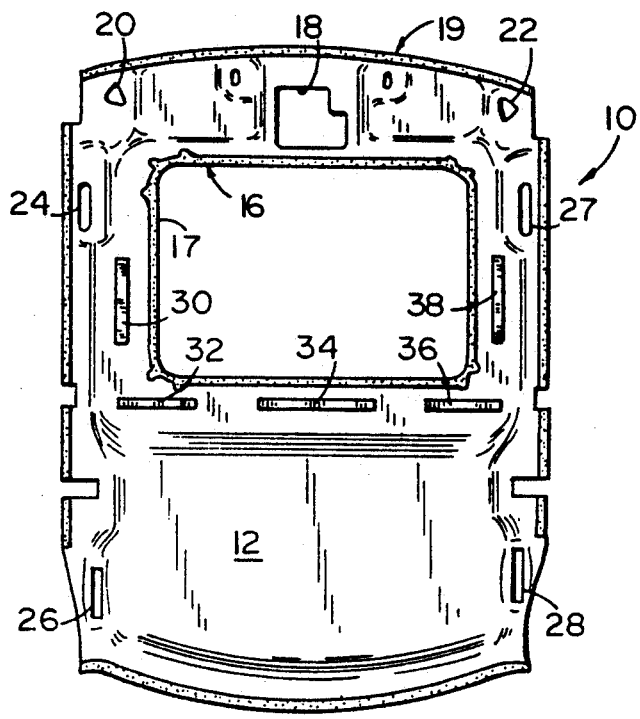
FIG. 1 is a top plan view of a headliner embodying a preferred embodiment of the present invention.

Referring initially to FIG. 1 there is shown an integrally formed and molded headliner 10 for mounting to cover the roof 25 of a vehicle 11 (FIG. 3) such as an automobile. Shown in FIG. 1 is the top plan view of the headliner in which the upper surface 12 which faces the supporting roof structure when installed is shown. Opposite surface 12 is a decorative lower surface 13 covered by an upholstery material 14 (FIG. 3), such as a fabric, to provide a decorative surface exposed to the interior of the vehicle. Headliner 10 includes a relatively large rectangular central opening 16 defining a sunroof opening. Forward of opening 16 is a small rectangular opening 18 near the forward edge 19 of the headliner for receiving an overhead console such as an electronic compass module. On either corner near edge 19 are triangular apertures 20 and 22 for receiving visor mounting brackets therein Along the lateral sides of headliner 10 are rectangular slots 24, 26, 27 and 28 for receiving grab handles which are positioned above the vehicle doors.

The headliner is a three-dimensional curvilinear shape made to conform to the vehicle roof for a given vehicle and defines the upper interior exposed surface of the vehicle. Headliner 10 can be made in a variety of presently employed commercial processes such as by molded material such as a resin impregnated compressed fibrous bat material defining a core or substrate 15 (FIG. 3) covered by the fabric 14 which can be integrated in the molding process. This headliner construction can be of the type disclosed in U.S. Pat. No. 4,828,910 entitled SOUND ABSORBING LAMINATE issued on May 9, 1989; the disclosure of which is incorporated herein by reference.

Figure 2:
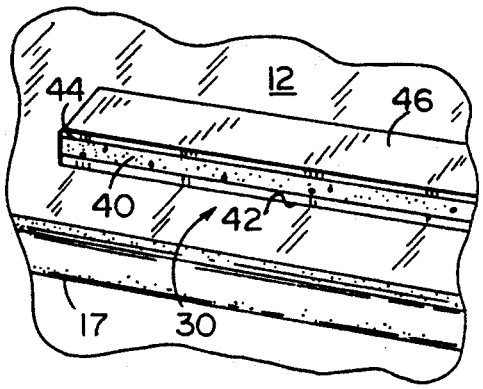
FIG. 2 is an enlarged fragmentary perspective view of a portion of the structure shown in FIG. 1.
Figure 3:
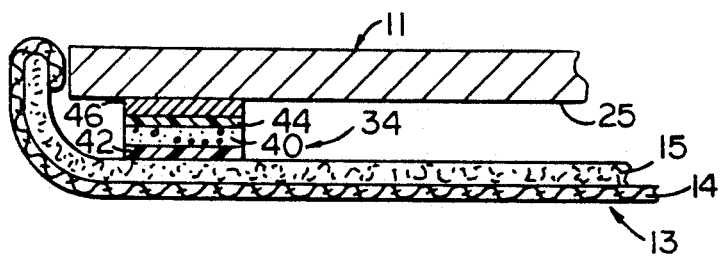
FIG. 3 is an enlarged fragmentary vertical cross-sectional view of an edge of the headliner shown in FIGS. 1 and 2 shown installed in a vehicle.

Mounted to the headliner adjacent the peripheral edge 17 of opening 16 and at least partially circumscribing opening 16 along at least three sides thereof are a plurality of magnetic mounting means such as flexible strip magnetic mounting assemblies 30, 32, 34, 36 and 38. Magnet assemblies 30 and 38 are positioned laterally adjacent the sides of aperture 16 and spaced from the peripheral edge 17 of the aperture while magnet assemblies 32, 34 and 36 are Positioned in generally equally spaced relationship adjacent and spaced from the rear facing edge of aperture 17. FIGS. 2 and 3 illustrate a first embodiment of the magnet assemblies 30 which includes a foam polymeric pad 40 bonded to surface 12 of the headliner by a layer of hot melt adhesive 42. A flexible bar magnet 46 is mounted on the opposite side of pad 40 and is secured to the pad by a layer of adhesive 44.

In a preferred embodiment of the invention, the hot melt glue 42 is applied using a conventional gun and the foam layer 40 was pressed over the bead of molten glue resulting in a final layer of adhesive having a thickness of from about 0.010 to about 0.015 inches The hot melt glue is a generally available type such as Findley Adhesive #1745. The foam layer 40 is a closed-cell PVC or cellular urethane with a density of approximately 7 to 50 #/ft$^3$ and in a preferred embodiment was 20 #/ft$^3$. The thickness of the foam material ranges from about 0.080 to 0.4 inches depending upon the particular headliner and vehicle combination in which the attachment system is employed. The adhesive layer 44 is a pressure sensitive acrylic adhesive for withstanding the substantially high temperatures incurred in the roof area of a vehicle and a commercially available 3M adhesive such as 3M468 having a thickness of approximately 0.005 inches roller coated to the surface of foam section 40 was employed.

Figure 4:
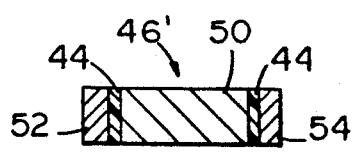
FIG. 4 is an enlarged vertical cross-sectional view of an alternative attachment structure.

Magnet means 46 is an extruded flexible magnetic material which includes a iron ferrite bonded in a polymeric substrate such as NYLON with the ferrite constituting typically about 80 percent of the total volume of the magnetic strip 46 so formed Material for such magnets is commercially available from the Dynacast Magnetics Division of Flexmag Industries Inc., of Cincinnati, Ohio. In the embodiment of the invention shown in FIGS. 1–3, each of the magnetic strips were multiple-pole magnetized and had a thickness of from about 030 to 120 inches. The width ranged from $\frac{1}{4}$ inch to $1\frac{1}{2}$ inches with the typical width being approximately 1 inch. In an alternative embodiment of the invention, the magnet means 46' is used in place of magnet 46 in FIGS. 1–3. Magnet means 46' includes, as seen in FIG. 4, a bipolar magnet 50 of the same material as magnet 46 but magnetized in a bipolar fashion. On either side of magnet 50 is a steel pole piece having a thickness of approximately $\frac{1}{8}$ of the thickness of the magnetic material itself. The pole pieces 52 and 54 can be bonded to the sides of the magnetic 50 using the same 3M468 adhesive identified above. In the embodiment shown in FIG. 4, the magnet 50 is preferably bipolar which concentrates the attractive force through the pole pieces with respect to the underlying sheet metal roof structure 25 (FIG. 3) of the vehicle.

The headliner 10 of the present invention is installed during assembly of the vehicle typically by flexing the headliner and inserting it through the open windshield area of the vehicle on the assemblyline. The headliner is then inserted upwardly in general alignment for installation with the magnetic strips 30–38 securing the edge of the headliner proximate the sunroof opening 16 in adjacent relationship to the vehicle roof and in general alignment with the remaining underlying support structures of the other accessory apertures of the headliner. The utilization of the magnetic strips permit the headliner to be relatively easily shifted for precise alignment as necessary while holding the headliner in position for assembly of the remaining structural elements including visors, grabhandles, consoles, maplamps and the like. The utilization of the cushioning material isolates the headliner from the underlying support structure and therefore provides additional acoustical damping allowing the elimination of additional acoustical damping material sometimes required. Although rectangular strips of flexible magnetic material were used in the preferred embodiment of the invention, other magnetic material and shapes could also be used in the system of the present invention. These and other modifications of the preferred embodiments of the present as described herein can be made without departing from the spirit or scope thereof as defined by the appended claims.

The embodiments of the invention in which an exclusive property or privilege is claimed are defined as follows:

1. A headliner for the roof of a vehicle having an enlarged aperture for a sunroof comprising:
   a substrate for covering the interior of a vehicle roof, said substrate having an aperture substantially identical to the aperture in said vehicle roof;
   a plurality of elongated magnetic members each being rectangular in shape and positioned on said substrate with its longer sides extending along the peripheral edge of said aperture in said substrate with one of said longer sides located adjacent the peripheral edge of said aperture in said substrate; and
   an acoustically damping cushion member for each of said magnetic members and having the shape of each magnetic member; means for attaching said magnetic members to said cushion member and means for attaching said cushion members to said substrate, whereby said magnetic members and said cushion members can securely but movably support said substrate on the roof of said vehicle about said aperture; said cushion members spacing the headliner from the roof to provide open areas between the roof and headliner thereby isolating the headliner from the overlying roof allowing the elimination of additional acoustical damping material between said roof and headliner;

2. A headliner for the roof of a vehicle comprising:
   a substrate for covering the interior of a vehicle roof, said substrate conforming in shape to the shape of said vehicle roof whereby the peripheral edge of said substrate conforms to the peripheral edge of said roof;
   a first series of a plurality of elongated magnetic members spaced along the peripheral edge of said substrate, each magnetic member being rectangular in shape and positioned on said substrate with its longer sides extending along the peripheral edge of said substrate with one of said longer sides located adjacent the peripheral edge of said substrate; and
   a first acoustically damping cushion member for each of said magnetic members and having the shape of each magnetic member; means for attaching said magnetic members to said cushion member and means for attaching said cushion members to said substrate, whereby said magnetic members and said cushion members can securely but movably support said substrate against the peripheral edge of the roof of said vehicle said cushion members spacing the headliner from the roof to provide open areas between the roof and headliner thereby isolating the headliner from the overlying roof allowing the elimination of additional acoustical damping material between said roof and headliner.

3. The headliner for a roof of a vehicle as claimed in claim 2 in which the vehicle has an enlarged aperture for a sunroof in which said substrate has an aperture substantially identical to the aperture in said vehicle roof;

a second series of a plurality of elongated magnetic members spaced along the peripheral edge of said aperture of said substrate each magnetic member being rectangular in shape and positioned on said substrate with sides extending along the peripheral edge of said aperture in said substrate with one of said longer sides located adjacent the peripheral edge of said substrate; and a second acoustically damping cushion member for each of said magnetic members of said second series and having the shape of each magnetic member of said second series; means for attaching each of said magnetic members of said second series to one of said cushion members of said second series and means for attaching said cushion members of said second series to said substrate, whereby said magnetic members of said second series and said cushion members of said second series can tightly but movably support said substrate against the roof of said vehicle about said aperture said first and second cushion members spacing the headliner from the roof to provide open areas between the roof and headliner thereby isolating the headliner from the overlying roof allowing the elimination of additional acoustical damping material between said roof and headliner.

4. The apparatus as defined in claim 1 wherein each of said magnetic members comprises a flexible magnetic strip.

5. The apparatus as defined in claim 2 wherein each of said magnetic members comprises a flexible magnetic strip.

6. The apparatus as defined in claim 3 wherein each of said magnetic members comprises a flexible magnetic strip.

* * * * *

UNITED STATES PATENT AND TRADEMARK OFFICE
CERTIFICATE OF CORRECTION

PATENT NO. : 5,280,991
DATED : January 25, 1994
INVENTOR(S) : Walter M. Weiland

It is certified that error appears in the above-indentified patent and that said Letters Patent is hereby corrected as shown below:

Column 1, line 26:
　　After "required" insert --.--.

Column 2, line 38:
　　After "therein" insert --.--.

Column 2, line 63:
　　"Positioned" should be --positioned--.

Column 3, line 8:
　　After "inches" insert --.--.

Column 3, line 27:
　　After "formed" insert --.--.

Column 3, lines 32 and 33:
　　"030 to 120" should be --.030 to .120--.

Signed and Sealed this

Sixteenth Day of August, 1994

Attest:

BRUCE LEHMAN

Attesting Officer　　　　Commissioner of Patents and Trademarks